US011941572B1

(12) United States Patent
Ravichandran et al.

(10) Patent No.: US 11,941,572 B1
(45) Date of Patent: Mar. 26, 2024

(54) MACHINE LEARNING ITEM DELIVERY USING SENSOR DATA

(71) Applicant: Amazon Technologies, Inc., Seattle, WA (US)

(72) Inventors: Ruth Ravichandran, Redmond, WA (US); Hebaallah Aly Abdelhalim Aly Ismail, Bellevue, WA (US); Zheng Wang, Sammamish, WA (US); Shao-Wen Yang, New York, NY (US); Yang Pan, San Jose, CA (US); David Hung Huynh, San Jose, CA (US); Andrey Li, San Jose, CA (US); Hoshgeldy Tagangeldyevich Tachmuradov, Soquelq, CA (US); Steven Larson, Georgetown, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 495 days.

(21) Appl. No.: 17/203,098

(22) Filed: Mar. 16, 2021

(51) Int. Cl.
*G06Q 10/0833* (2023.01)
*G06N 7/01* (2023.01)
*G06N 20/00* (2019.01)
*G06T 7/579* (2017.01)
*G06T 19/00* (2011.01)
*H04W 4/02* (2018.01)
*H04W 4/024* (2018.01)
*H04W 4/38* (2018.01)
*H04W 4/80* (2018.01)

(52) U.S. Cl.
CPC ......... *G06Q 10/0833* (2013.01); *G06N 7/01* (2023.01); *G06N 20/00* (2019.01); *G06T 7/579* (2017.01); *G06T 19/006* (2013.01); *H04W 4/023* (2013.01); *H04W 4/024* (2018.02); *H04W 4/026* (2013.01); *H04W 4/027* (2013.01); *H04W 4/38* (2018.02); *H04W 4/80* (2018.02)

(58) Field of Classification Search
CPC ............ G06Q 10/083; G06Q 10/0832; G06Q 10/0833; G06Q 10/0385; G06Q 10/0837; G06Q 10/0838
See application file for complete search history.

(56) References Cited

U.S. PATENT DOCUMENTS

2019/0385121 A1* 12/2019 Waliany .................... G06F 9/54
2020/0074386 A1* 3/2020 Mossoba ............... G06F 40/205

OTHER PUBLICATIONS

Fox, V., et al. "Bayesian filtering for location estimation." IEEE pervasive computing 2.3 (2003): 24-33. (Year: 2003).*

(Continued)

*Primary Examiner* — Emmett K. Walsh
(74) *Attorney, Agent, or Firm* — Thomas Horstemeyer, LLP

(57) ABSTRACT

Various embodiments are disclosed for providing machine learning routines with peripheral device data to infer driver activity and location. Peripheral device data may be collected on a peripheral device having a machine learning routine executing thereon to infer driver activity and perform improved estimation of driver location. Using driver activity and location estimation, contextually relevant delivery workflow assistance may be automatically provided to a delivery driver or other individual without requiring manual input, thereby improving driver safety and operational efficiency.

20 Claims, 13 Drawing Sheets

(56) References Cited

OTHER PUBLICATIONS

Tatasciore, Daniele. DelivAR: An augmented reality mobile application to expedite the package identification process for last-mile deliveries. Diss. Thesis for: M. Sc. Digital Media, University of Bremen available online, 2018. (Year: 2018).*

* cited by examiner

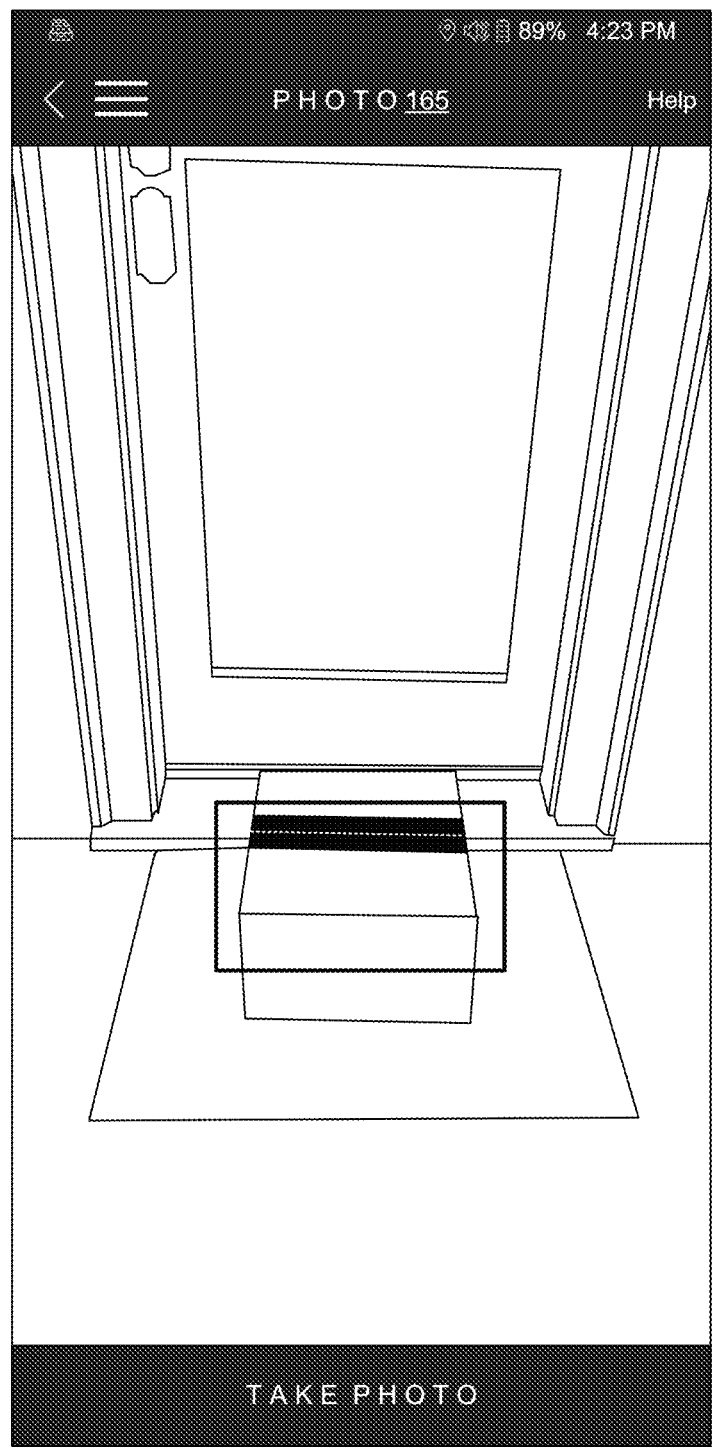
FIG. 2E  ↖168

MACHINE LEARNING ITEM DELIVERY USING SENSOR DATA

BACKGROUND

Today, delivery drivers manually interact with a mobile application during delivery to navigate to a delivery address, scan packages, generate or consult customer notes, report delivery progress, and confirm delivery of an item. Over the course of a day, a delivery driver, who often makes hundreds of deliveries per day, must access the mobile application and a mobile device having the mobile application executed thereon hundreds to thousands of times. When a delivery driver carries multiple packages or an overweight package, for example, interacting with the mobile device and the mobile application becomes burdensome, increases service time, and potentially distracts the delivery driver.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2F are example user interfaces rendered by a client device in the networked environment of FIG. 1 according to various embodiments of the present disclosure.

DETAILED DESCRIPTION

The present disclosure relates to machine learning item delivery using sensor data collected during a delivery of one or more items. More specifically, various embodiments are described herein for using data collected from one or more sensors and machine learning routines to infer driver activity and perform improved estimation of driver location. Using driver activity and location estimation, contextually relevant delivery workflow assistance may be automatically provided to a delivery driver or other individual without requiring manual input, thereby improving driver safety and operational efficiency.

According to various embodiments, a delivery driver may wear a peripheral device having one or more sensors that generate peripheral device data. For instance, a peripheral device worn by a delivery driver may include a global positioning system (GPS) sensor, an inertial measurement unit (IMU) sensor, a wireless fidelity (Wi-Fi) sensor, a barometer sensor, a short-range wireless communication sensor (e.g., a Bluetooth® or Zigbee® sensor), a camera or other imaging device, as well as other sensors. The peripheral device may collect data from the sensors which may be provided to one or more machine learning routines to estimate driver activity and driver location throughout the day.

The output from the machine learning routine may be employed to interface with a client device having a human-machine interface (HMI) employed by the driver, which may include a smartphone or smart glasses in some embodiments. The client device may provide timely and contextual delivery assistance without requiring manual interaction from the delivery driver. For example, in some embodiments, details about an item to be delivered may be automatically displayed when a delivery driver has arrived at a destination, a camera and scanning package state may be automatically launched when a delivery driver has retrieved a package, a customer delivery preference may be automatically displayed, navigation assistance may automatically be shown as the delivery driver walks to a delivery road entry or a delivery destination, and photographs or other digital images may be automatically captured when the delivery driver drops off a package at a destination.

In the following discussion, a general description of the system and its components is provided, followed by a discussion of the operation of the same.

Figure 1:
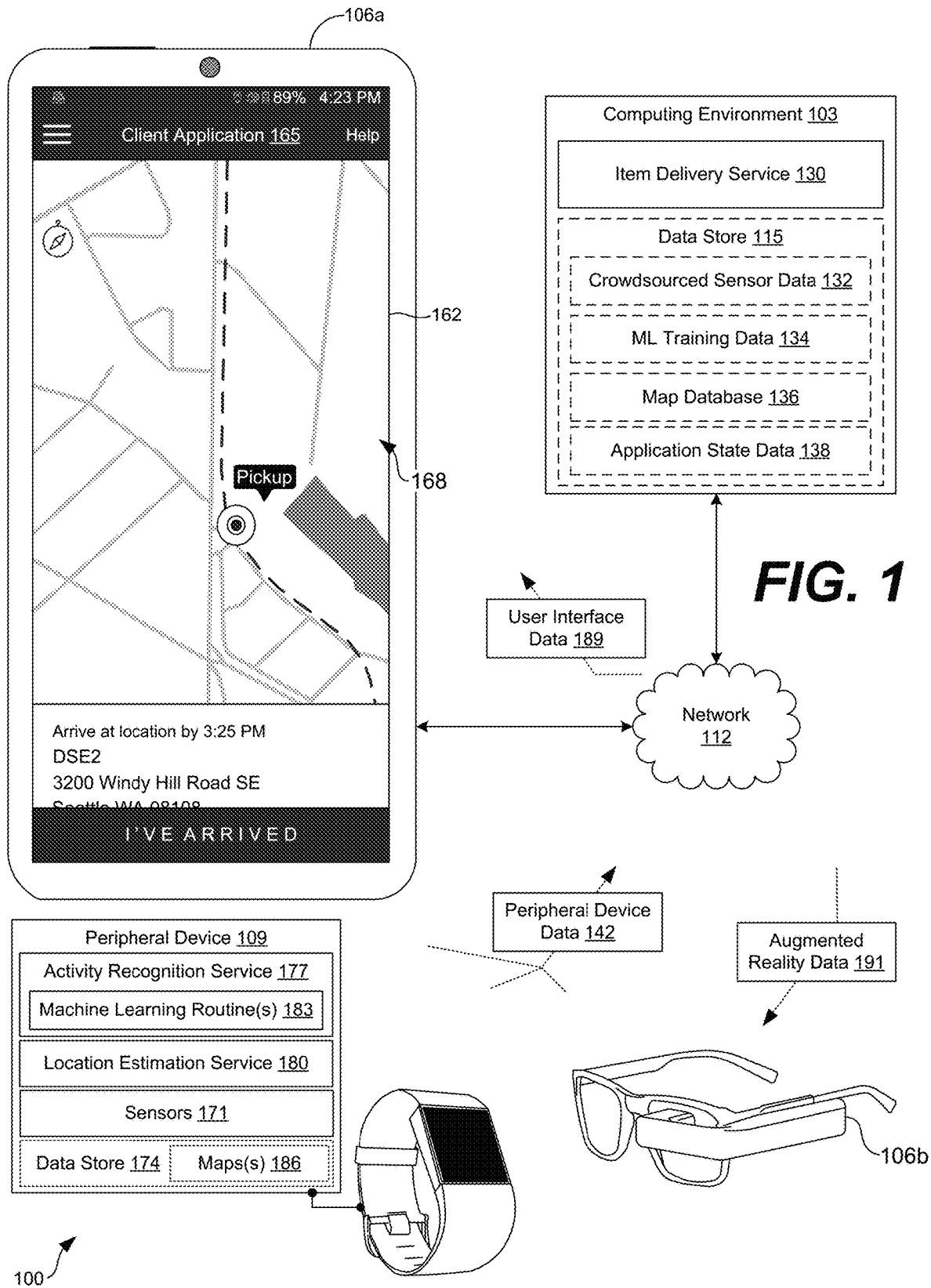
FIG. 1 is a drawing of a networked environment according to various embodiments of the present disclosure.

With reference to FIG. 1, a networked environment 100 is shown according to various embodiments. The networked environment 100 includes a computing environment 103, client devices 106a, 106b, and a peripheral device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include an item delivery service 130, and other applications, services, processes, systems, engines, or functionality not discussed in detail herein. The item delivery service 130 is executed to assist delivery drivers or other individuals with retrieving an item from an origination location and/or delivery of an item to a destination location. As such, the item delivery service 130 may send navigation information, customer preference information, item information, and other information to a client device 160 for display.

The data stored in the data store 115 includes, for example, crowdsourced sensor data 132, machine learning training data 134, a map database 136, application state data 138, and potentially other data. The crowdsourced sensor data 132 may include peripheral device data collected from peripheral devices 109 of a multitude of delivery drivers. The machine learning training data 134 may include labelled and/or manually-verified data to train one or more machine learning routines, as will be described. The map database 136 includes data used to generate one or more maps of a region, a building, a campus, or a group of buildings. Application state data 138 may include data used to transition between states of a client application 165, as will be described.

The client devices 106a, 106b (collectively "client devices 106") are representative of a plurality of client devices that may be coupled to the network 112. The client devices 106 may include, for example, a processor-based system such as a computer system. Such a computer system may be embodied in the form of a desktop computer, a smartphone, a smart glasses device (or other similar type of augmented reality device), a laptop computer, a personal digital assistant (PDA), a cellular telephone, a music player, a web pad, a tablet computer system, a gaming device, an electronic book reader, or other device with like capability. In some embodiments, the client device 106 may include a display 162. The display 162 may comprise, for example, one or more devices such as liquid crystal display (LCD) displays, gas plasma-based flat panel displays, organic light emitting diode (OLED) displays, electrophoretic ink (E-ink) displays, LCD projectors, or other types of display devices, etc. In other embodiments, the client device 106 may include a projector that projects images in a field of vision of the delivery driver, for instance, on a lens of a smart glasses device.

The client device 106 may be configured to execute various applications such as a client application 165 and/or other applications. The client application 165 may be executed in a client device 106, for example, to access network content served up by the computing environment 103 and/or other servers, thereby rendering a user interface 168 on the display 162. As such, the client application 165 may include, for example, a browser, a dedicated application, etc., and the user interface 168 may include a network page, an application screen, an augmented relative environment, etc. The client device 106 may be configured to execute applications beyond the client application 165 such as, for example, navigation applications, email applications, social networking applications, word processors, spreadsheets, and/or other applications.

The peripheral device 109 may include, for example, a wearable computing device having one or more sensors 171. As such, the peripheral device 109 may include a smart watch device, an activity tracking device, a body camera, or other network-enabled wearable technology device. The sensors may include, for example, a GPS sensor, an IMU sensor, a Wi-Fi sensor, a short-range wireless communication sensor, a temperature sensor, a barometer sensor, a camera, or other suitable sensor. The peripheral device 109 may be configured to be worn by the driver throughout the day during one or more deliveries. The peripheral device 109 may automatically collect measurements and other data from the sensors, and execute machine learning algorithms locally to detect driver activity and location throughout the day.

Various applications and/or other functionality may be executed in the peripheral device 109 according to various embodiments. Also, various data is stored in a peripheral device data store 174. The peripheral device data store 174 may be representative of a plurality of peripheral device data stores 174 as can be appreciated. The data stored in the peripheral device data store 174, for example, is associated with the operation of the various applications and/or functional entities described below.

The components executed on the peripheral device 109, for example, include an activity recognition service 177, a location estimate service 180, and other applications, services, processes, systems, engines, or functionality not discussed in detail herein. The activity recognition service 177 is executed to identify a current activity of a driver. In some embodiments, the activity recognition service 177 may employ one or more machine learning routines 183 to infer driver activity from peripheral device data 142 collected by the peripheral device 109. In some embodiments, the peripheral device 109 may execute the one or more machine learning routines 183 using raw data without filtering. However, in alternative embodiments, the peripheral device 109 may execute the one or more machine learning routines 183 using filtered data, as will be described. Further, the machine learning routines 183 may be supervised or unsupervised.

In embodiments in which the machine learning routines 183 are supervised, labelled training data collected from a delivery driver population may be employed to build machine learning models for different ones of a plurality of driver activities. More specifically, in one example, a first machine learning model may be generated to infer driver activity while the driver is driving to a delivery destination, a second machine learning model may be generated to infer driver activity during package seeking and retrieval from a vehicle cargo bay, and a third machine learning model may be trained to infer driver activity while a driver is walking to or from a delivery address or delivery destination to the vehicle. Using the trained machine learning models, the one or more machine learning routines 183 may infer and output a current status of a delivery driver in real-time which may be generalized across driver populations.

High-frequency driver location estimation may be necessary within a threshold distance of a delivery destination, such as, for example, one hundred yards of a delivery destination, to assist drivers with turn-by-turn navigation in complex addresses and indoor environments (e.g., apartment and condo buildings). As such, the location estimation service 180 is executed to use peripheral device data 142 to first construct a map 186 (e.g., an offline map) using simultaneous-localization-and-mapping (SLAM) routines and, thereafter, provide precise and accurate location estimation when a delivery driver revisits an area with the map 186.

In some embodiments, the location estimation service 180 may employ a Bayesian filter, such as Kalman filter, to provide a high-accuracy, sensor-fused location estimate using often noisy peripheral device data, which is often noisy data collected from GPS sensors, Wi-Fi sensors, and other sensors 171. Currently, delivery drivers have no visibility into areas that are not geo-mapped, such as corridors, walkways, and other indoor environments. Using peripheral device data 142 crowdsourced from a multitude of delivery drivers, the location estimation service 180 may generate a database of maps 186 (e.g., radio maps) with corresponding latitude-longitude references along routes taken by delivery drivers while walking to a delivery destination. The maps 186 may then be used for online location estimation when subsequent deliveries are made to the same addresses.

Next, a general description of the operation of the various components of the networked environment 100 is provided. To begin, it is understood that delivery drivers interact with a particular type of client application 165 on a client device 106 that facilitates a delivery process. For instance, the client application 165 may provide package pick-up and drop-off instructions, navigation directions, check-lists, customer notes, as well as confirm delivery of items. The data presented by the client application 165 is served up by the item delivery service 130.

However, at every step of the delivery process, a delivery driver must interact with the client device 106. For example, a delivery driver must interact with the client application 165 to navigate to a delivery destination, read customer notes, scan packages, and take delivery confirmation photographs. Each of these tasks may include taking the phone out of the pocket, interacting with a user interface 168, returning the client device 106 to the pocket, and so forth.

As these tasks are critical to the delivery workflow, automatically surfacing relevant operational assistance without requiring manual inputs from the driver may alleviate driver pain points in repeated interactions with the client application 165, thereby allowing the delivery driver to focus on delivering items, such as packages. This leads to increasing a driver's safety during the delivery and improving productivity. Inferring driver activity and estimating driver locations within a threshold distance of a delivery destination (e.g., within a last mile or last one-hundred yards) may provide delivery drivers with navigational assistance and may remove repetitive manual tasks which decrease cognitive load.

In current approaches, delivery drivers interact with the client application 165 approximately seven times in a sixty second single delivery. For example, driver interactions with the client application 165 include selecting an "I've arrived" button to record an event when the delivery driver has parked its vehicle, which is used to infer start of service time. Further driver interactions with the client application 165 include scanning machine-readable identifiers of items (e.g., two-dimensional and three-dimensional barcodes), confirming a number of items scanned, confirming a delivery drop off location (also known as a "reason code" selection), taking photographs for deliveries that require "Photo on Delivery," and acknowledging completion of a delivery sequence using a "Swipe to Finish" user interface component. In sum, current approaches rely on GPS data collected from the client device 106 and the delivery driver through manual interaction with the client application 165 repetitively over a course of a day, inducing an undesirable cognitive load.

Accordingly, a delivery driver may have a peripheral device 109 that is worn about the wrist, neck, in a pocket, or so forth. The peripheral device 109 is configured to collect data from one or more sensors 171 thereon. Using peripheral device data 142, the activity recognition service 177 may automatically infer a current status of driver activity. Further, using peripheral device data 142, the location estimation service 170 may automatically determine a location of the driver without any manual inputs from the delivery driver while providing high-accuracy, low-latency inferences throughout a delivery process. For example, the machine learning routines 183 may be trained using crowdsourced sensor data 132, which includes peripheral device data 142 crowdsourced from a multitude of delivery drivers.

As such, a machine learning routine 183 may thus infer, for example, that a delivery driver has parked its vehicle and combine an output of the machine learning routine 183 with the location estimation service 180 to determine that the delivery driver is within a delivery geo-fence. If within the delivery geo-fence, the peripheral device 109 may generate and store a timestamped event as a start of a service time, which may be communicated to the item delivery service 130. Further, navigation assistance may be provided to the delivery driver when "walking" statuses are detected to and from a delivery destination without requiring manual interaction from the delivery driver.

Once a peripheral device 109 detects an activity of a delivery driver, the peripheral device 109 may send a notification to a client device 106 to transition between states of the client application 165. Alternatively, the peripheral device 109 may send a notification to the computing environment 103 which then, in turn, sends user interface data 189 and/or augmented reality data 191 to the client device 106 that causes the client application 165 to transition between states.

In embodiments in which an augmented reality device, such as a smart glasses device, is utilized, the augmented reality device may generate an augmented reality environment in which images are projected onto a scene. For instance, for navigation states, the augmented reality device may project navigation images, such as arrows or other identifying images, to direct a delivery driver to a particular location.

While the activity recognition service 177 and the location estimation service 180 are shown as executing locally on a peripheral device 109, in alternative embodiments, the activity recognition service 177 and the location estimation service 180 may be executed in the computing environment 103. For instance, peripheral device data 142 may be communicated to the computing environment 103 which, in turn, executes the activity recognition service 177 and the location estimation service 180 using the peripheral device data 142. The computing environment 103 may then transition between states of a client application 165 based on a current activity and/or a current location of a delivery driver.

While FIG. 1 shows a peripheral device 109 generating peripheral device data 142 it is understood that, in some embodiments, peripheral device data 142 may be collected from devices beyond the peripheral device 109. For instance, peripheral device data 142 may be collected from a client device 106 comprising a smart phone, a client device 106 comprising smart glasses, and so forth. Additionally, peripheral device data 142 may be collected from a computing device of a vehicle of a delivery driver.

Referring next to FIGS. 2A-2F, various example user interfaces 168 of a client application 165 are shown. Specifically, the user interfaces 168 of FIGS. 2A-2F depict differing states of a client application 165 that facilitate a delivery process. As noted above, at every step of the delivery process, a delivery driver must interact with the client application 165. For example, a delivery driver must interact with the client application 165 to navigate to a delivery destination, shown in FIG. 2A, and select an "I've Arrived" user interface component 203 when complete. Thereafter, the delivery driver must review a delivery destination, shown in FIG. 2B, and select the "Navigate" user interface component 206 to start a navigation state where the delivery driver drives to the delivery destination and navigation aides are provided to the delivery driver.

Figure 2A:
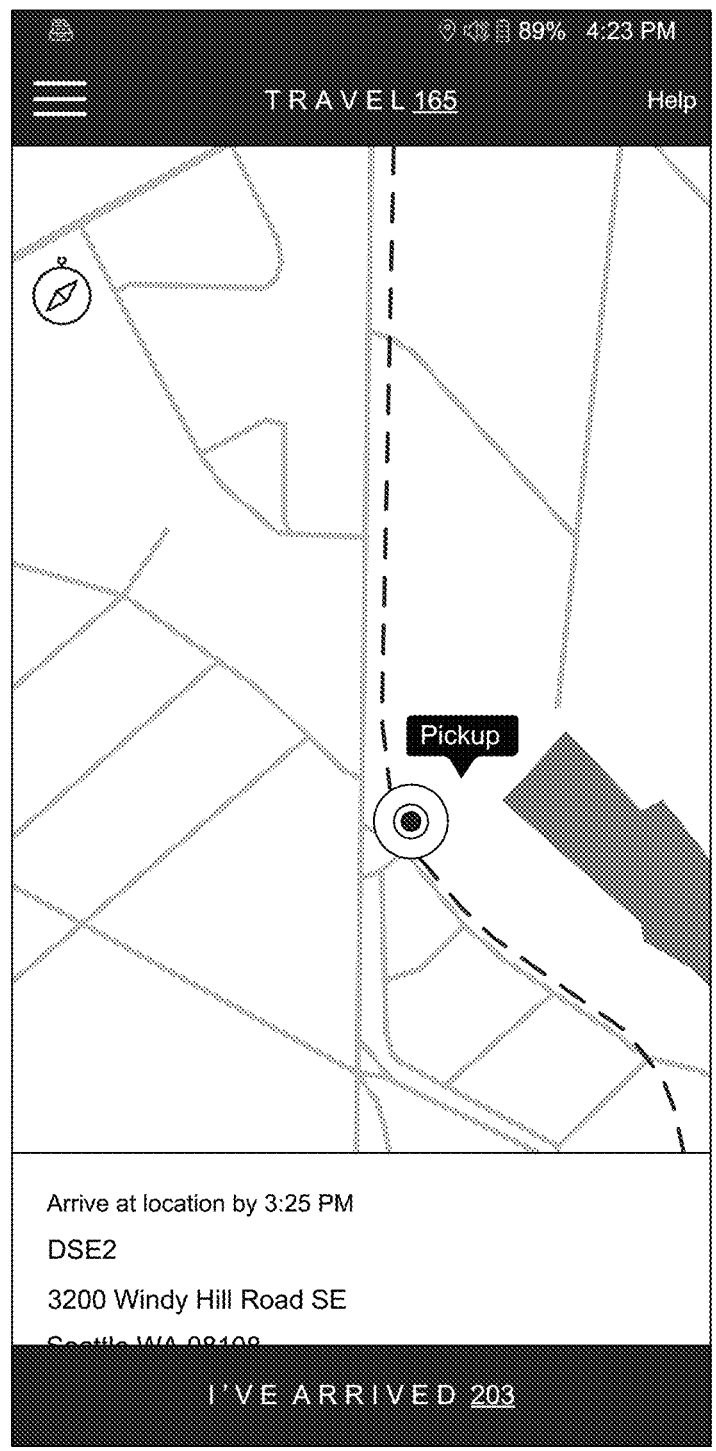
Figure 2B:
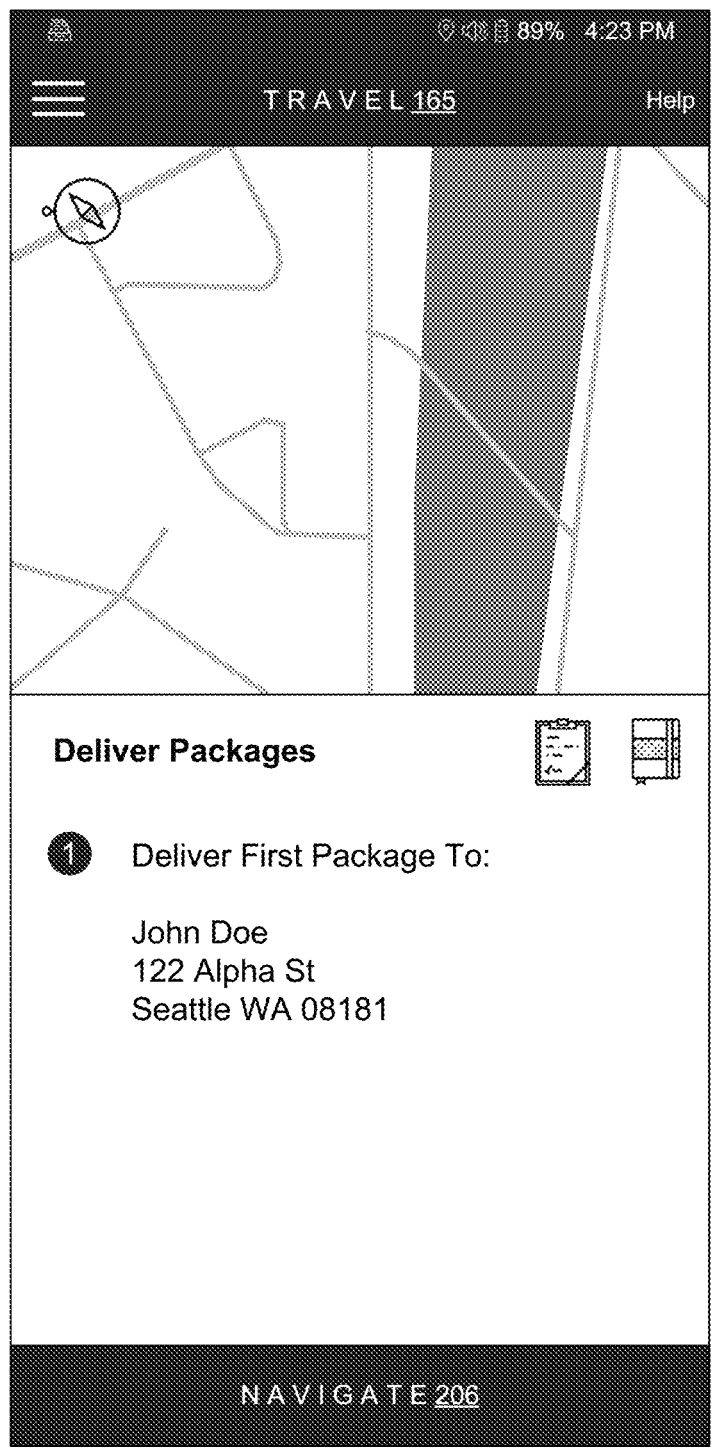
Figure 2C:
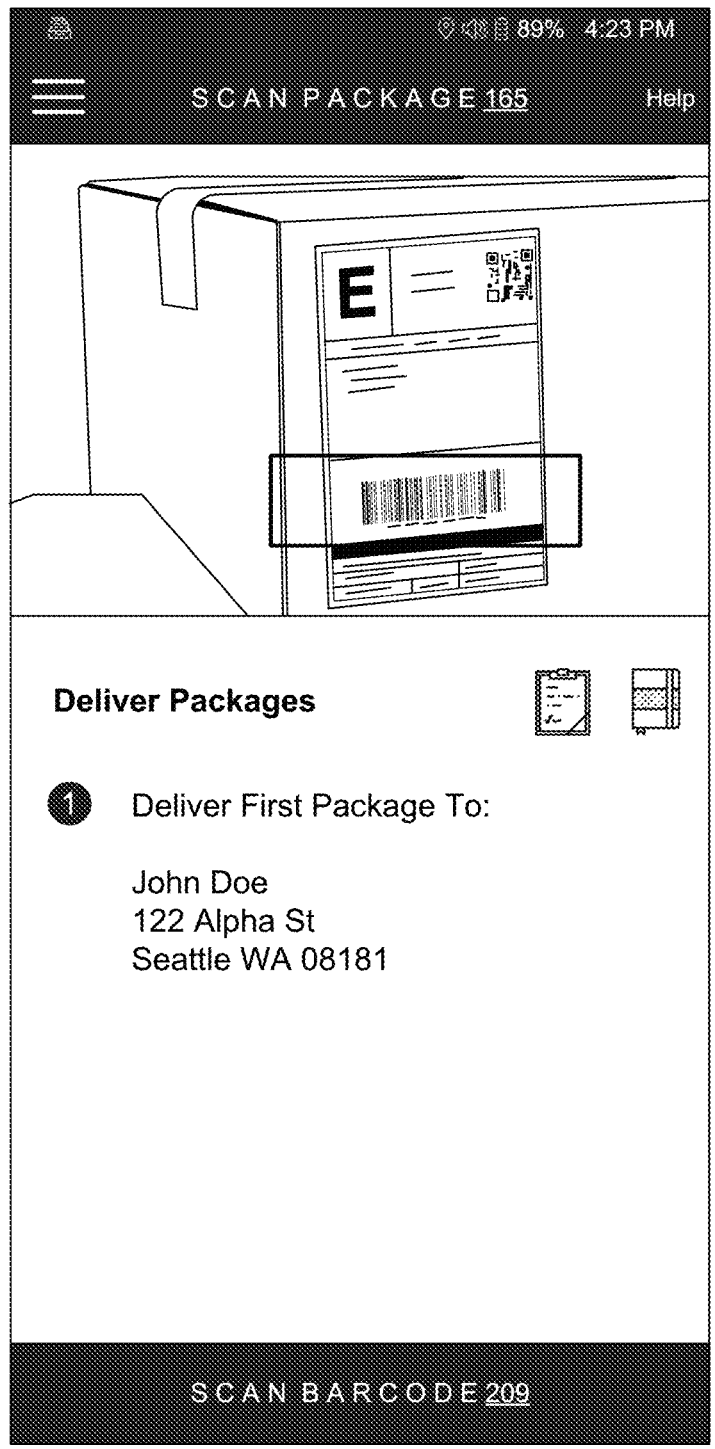
Figure 2D:
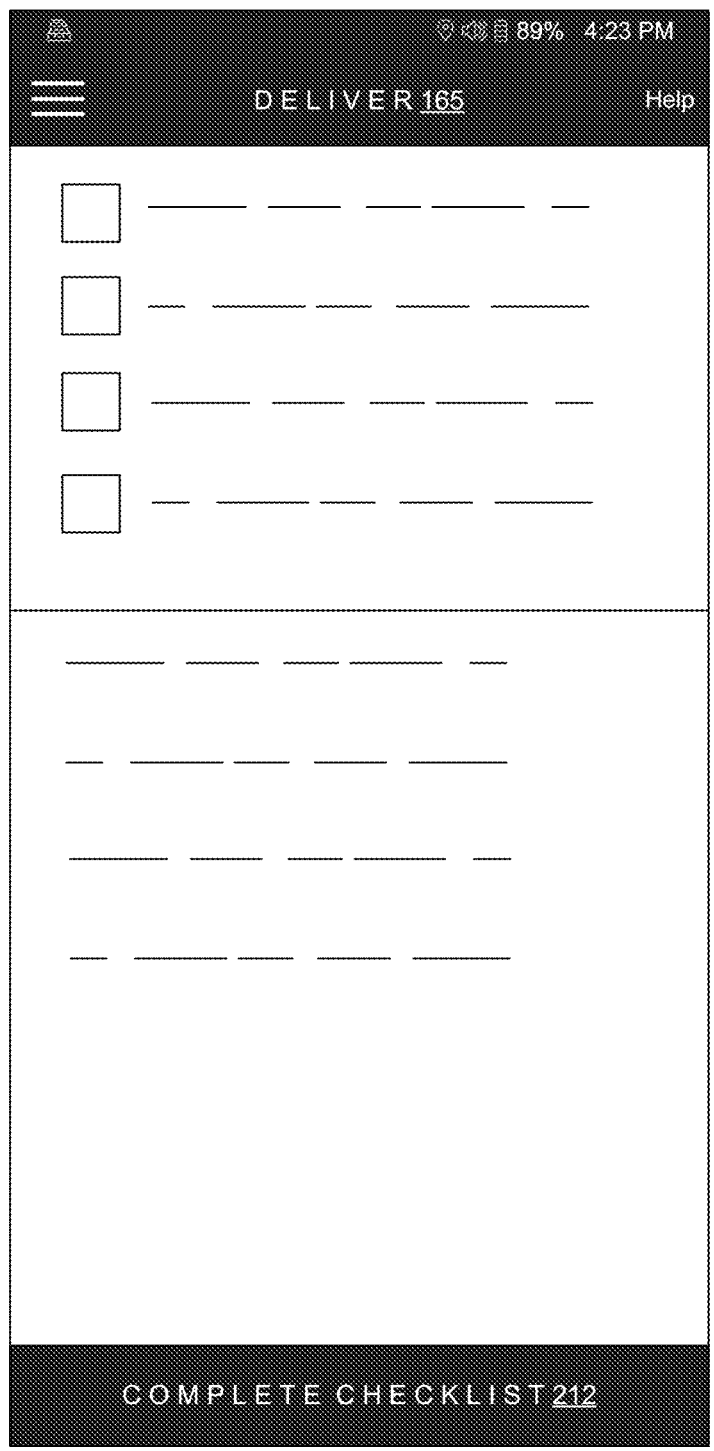
Figure 2F:
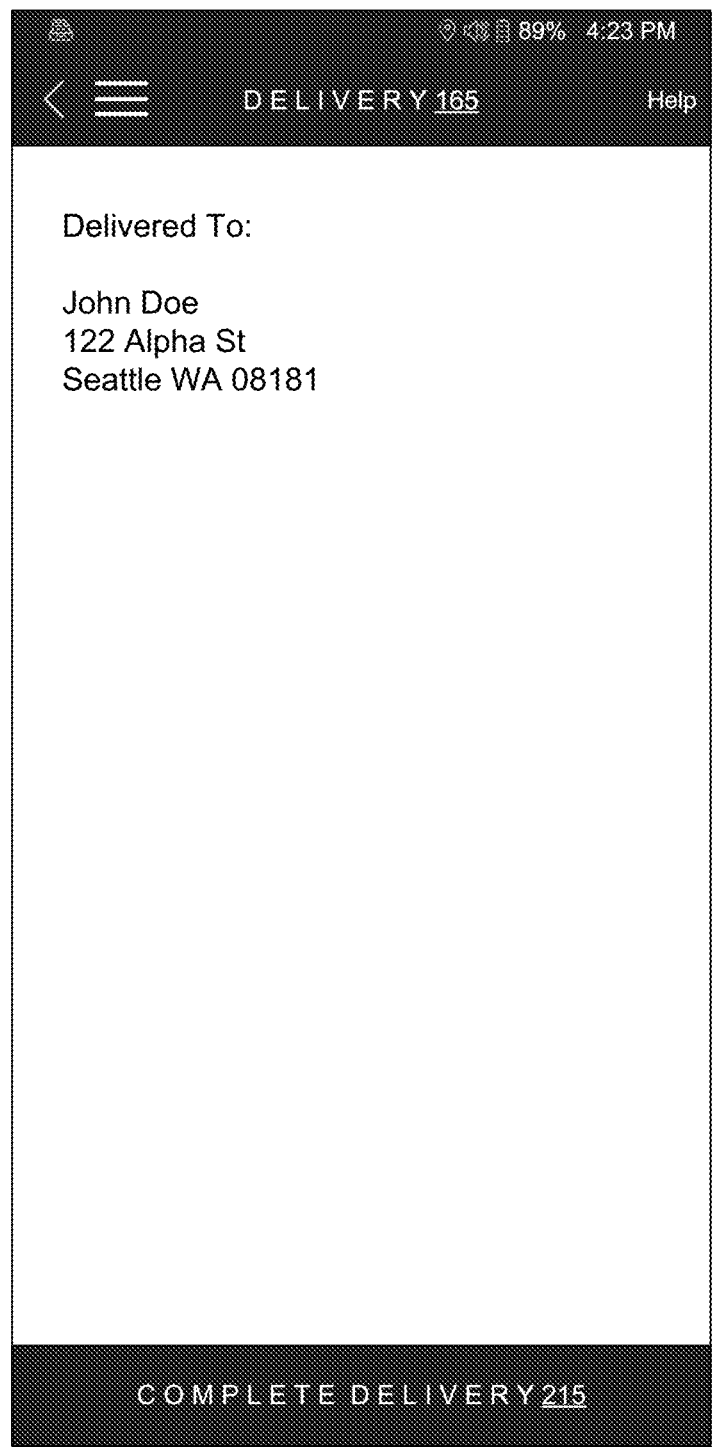

In FIG. 2C, the delivery driver is required to scan a barcode of an item (e.g., a package) when retrieving the item from a cargo area and select the "scan barcode" user interface component 209 to proceed. In FIG. 2D, the delivery driver must review and/or complete a checklist prior to completing a delivery of an item and select the "complete checklist" user interface component 212 to proceed to the next state. In FIG. 2E, the delivery driver must interact with the client application 165 to take a photograph of a delivered item (e.g., a package left on a doorstep) for items requiring proof-of-delivery. In FIG. 2F, the delivery driver must select the "complete delivery" user interface component 215 to finalize a delivery.

As such, it can be seen how, in current approaches, delivery drivers must interact with the client application 165 approximately seven times in a sixty second single delivery. However, the embodiments described herein may automatically transition between the user interfaces 168 and/or the states associated therewith without manual interaction (e.g., without having to select buttons or other user interface components).

Figure 3:
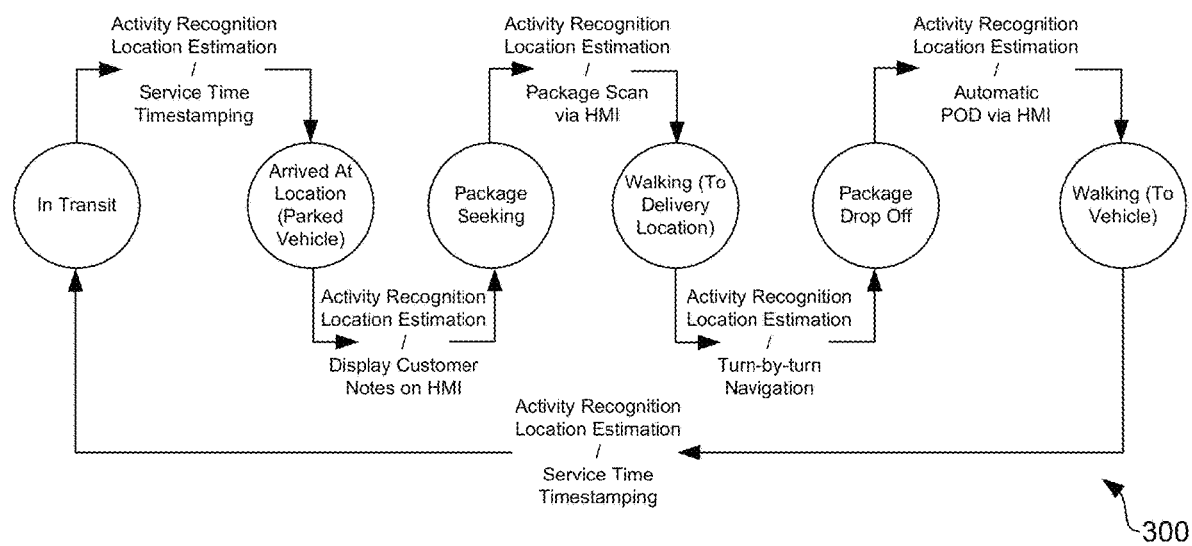
FIG. 3 is a flow diagram illustrating driver states during a delivery process according to various embodiments of the present disclosure.

Turning now to FIG. 3, a flow diagram 300 is shown illustrating driver states during a delivery process according to various embodiments of the present disclosure. As noted above, the machine learning routines 183 may be executed to automatically transition between states of a client application 165 with minimal or no manual interaction with a client device 106. During a delivery process, for instance, in a last mile of a delivery of an item, a delivery driver may transition between various states shown in FIG. 3.

The activity recognition service 177 and the location estimation service 180 may automatically surface relevant outputs between state transitions during a delivery workflow process. A current activity of a delivery driver and a current location of the delivery driver in each state may automatically be detected by the machine learning routines 183 and be used to provide assistance (e.g., providing turn-by-turn navigation), automate processes (e.g., taking photographs on delivery), and collect various metrics (e.g., service times) which may be used for route planning.

In FIG. 3, the activities of a delivery driver may include "in transit," "arrived at location (parked vehicle)," "package seeking," "walking (to delivery location)," "package drop off," and "walking (to vehicle)." It is understood that these are merely examples of the activities of a delivery driver and, as such, it is further understood that additional statuses may be employed.

Peripheral device data 142, such as IMU, Wi-Fi, and GPS data, may be continuously collected from the peripheral device 109 and provided as inputs to the activity recognition service 177 and the location estimation service 180. First, with respect to the activity recognition service 177, delivery driver activity during a last threshold of a journey (e.g., a last mile) may fall into one of three classes, such as, driving to a delivery destination, package seeking and retrieval from a cargo bay of a vehicle, and walking to and from the delivery address to a vehicle.

The machine learning routines 183 may be executed to infer driver activity from raw IMU data collected by the peripheral device 109. In one example, the computing environment 103 may employ labelled and manually-verified training data collected from a subset of a delivery driver population to build a machine learning model for each of the three driver activities. The one or more machine learning routines 183 may use the machine learning models to infer driver activity in real-time.

It is beneficial to have accurate and high-frequency driver location estimation, for instance, in the last hundred yards of a delivery process to assist delivery drivers with turn-by-turn navigation in complex addresses involving indoor environments. As such, a sensor fusion routine may be executed to use GPS, IMU, and Wi-Fi data to first construct an offline map using one or more simultaneous-localization-and-mapping routines. Thereafter, a precise and accurate location estimation may be provided when a delivery driver revisits an area with the offline map.

Figure 4:
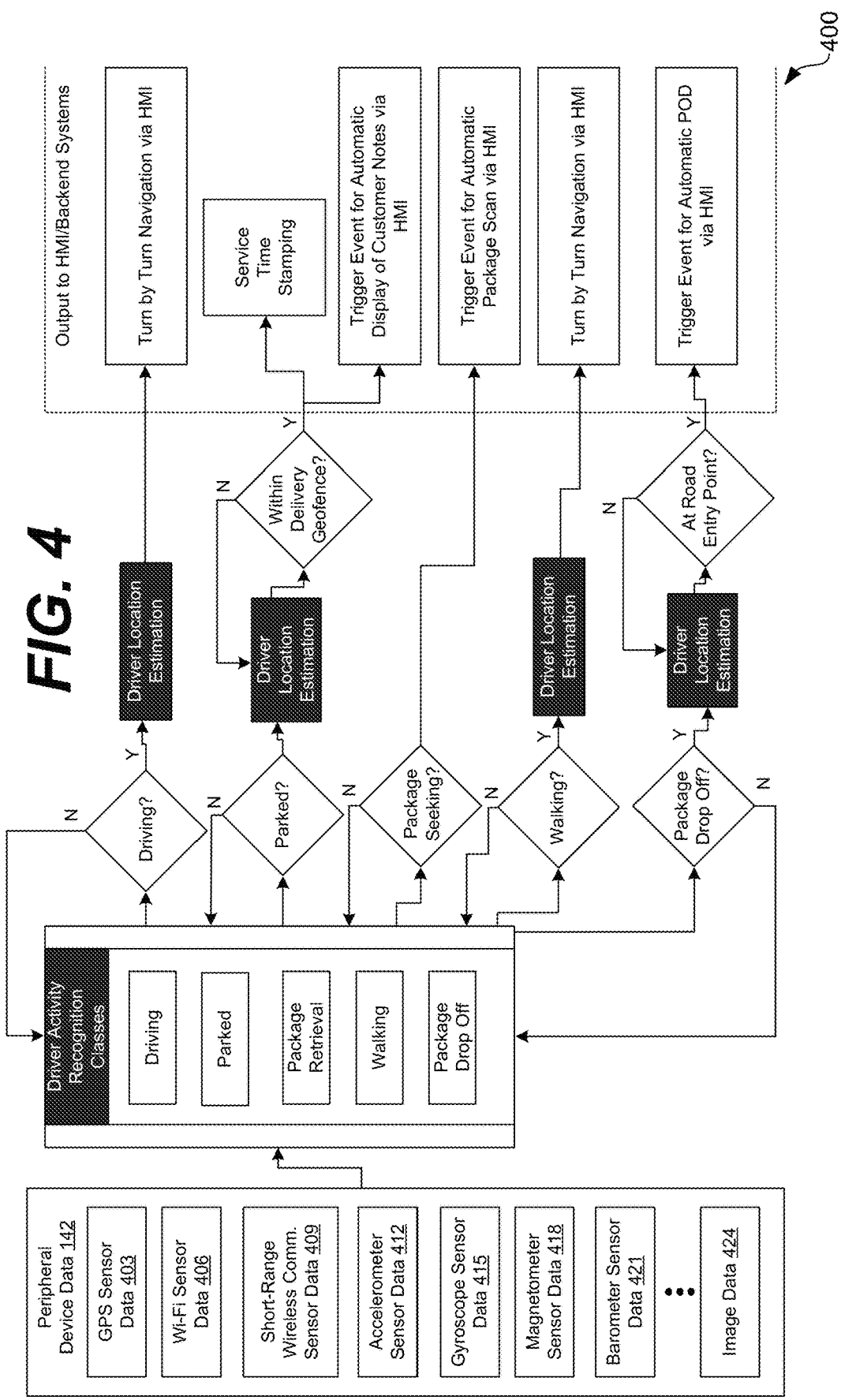
FIG. 4 is a flowchart illustrating one example of a delivery process according to various embodiments of the present disclosure.

Moving on to FIG. 4, a flowchart 400 is shown illustrating one example of a delivery process according to various embodiments of the present disclosure. As shown in FIG. 4, peripheral device data 142 may include, for example, GPS sensor data 403, Wi-Fi sensor data 406, short-range wireless communication sensor data 409 (e.g., Bluetooth® or Zigbee® data), accelerometer sensor data 412, gyroscope sensor data 415, magnetometer sensor data 418, barometer sensor data 421, image data 424, among other data. As the peripheral device data 142 is generated on a peripheral device 109, the peripheral device data 142 may be provided to the activity recognition service 177 and/or location estimate service 180. The barometer sensor data 421 may be used to estimate a floor of a building on which a delivery driver is located, as may be appreciated.

Using the peripheral device data 142, the activity recognition service 177 may execute one or more machine learning routines 183 to determine a current activity of a delivery driver. To this end, the activity recognition service 177 may assign an activity to one of various driver activity recognition classes.

For instance, while a delivery driver is in transit, the activity recognition service 177 may detect the first activity class of "driving" and call the location estimation service 180 to obtain a current location of the delivery driver. This may be used to provide navigation through a client device 106, such as an augmented reality device.

When the delivery driver arrives at a delivery location, the activity recognition service 177 may detect a change in driving speed for example, and the location estimation service 180 may determine whether the delivery driver is within the delivery geo-fence. If the delivery driver is within a delivery geo-fence, a second driver activity class of "parking" may be detected and a start of a service time for a corresponding delivery may be recorded in the data store 115 by the computing environment 103.

Once the delivery driver parks its vehicle, the peripheral device 109 may cause an automatic display of customer notes on the client device 106. As the driver moves to the cargo in the vehicle and retrieves an item, the activity recognition service 177 may detect the third activity class of "package retrieval." Through an application of heuristics on driver location and delivery operational sequences, the machine learning routines 183 may infer package seeking in real-time, which may cause the peripheral device 109 to trigger an automatic launch of a camera and/or a scanning interface on the client device 106. Once an item has been retrieved the delivery driver starts walking, the activity recognition service 177 may infer a fourth activity class of "walking." When a walking activity is inferred, the location estimation service 180 may fetch an offline radio map and estimate a location of the delivery driver in real-time using the peripheral device data 142. During this event, turn by turn navigation may be provided to the delivery driver through the client device 106 until the delivery driver reaches a road-entry point of a delivery address.

The activity recognition service 177 may detect when the delivery driver reaches the delivery doorstep and stops walking and may interact with the location estimation service 180 to determine if the delivery driver is at a delivery doorstep. The driver activity recognition model then detects a fifth "package drop-off" activity. This triggers an event on the on body camera on the driver to automatically take a photo to confirm the completion of the delivery process.

As the driver walks back to its vehicle, the activity recognition service 177 may again detect a "walking" event and the location estimation service 180 may provide turn-by-turn navigation on the client device 106. Once the driver reaches its vehicle, the activity recognition module infers the end of the 'walking' event and records the end of the service time stamp. As the driver resumes transit, the process continues without any manual intervention from the driver during the operational workflow. Thereafter, the process may proceed to completion.

Figure 5:
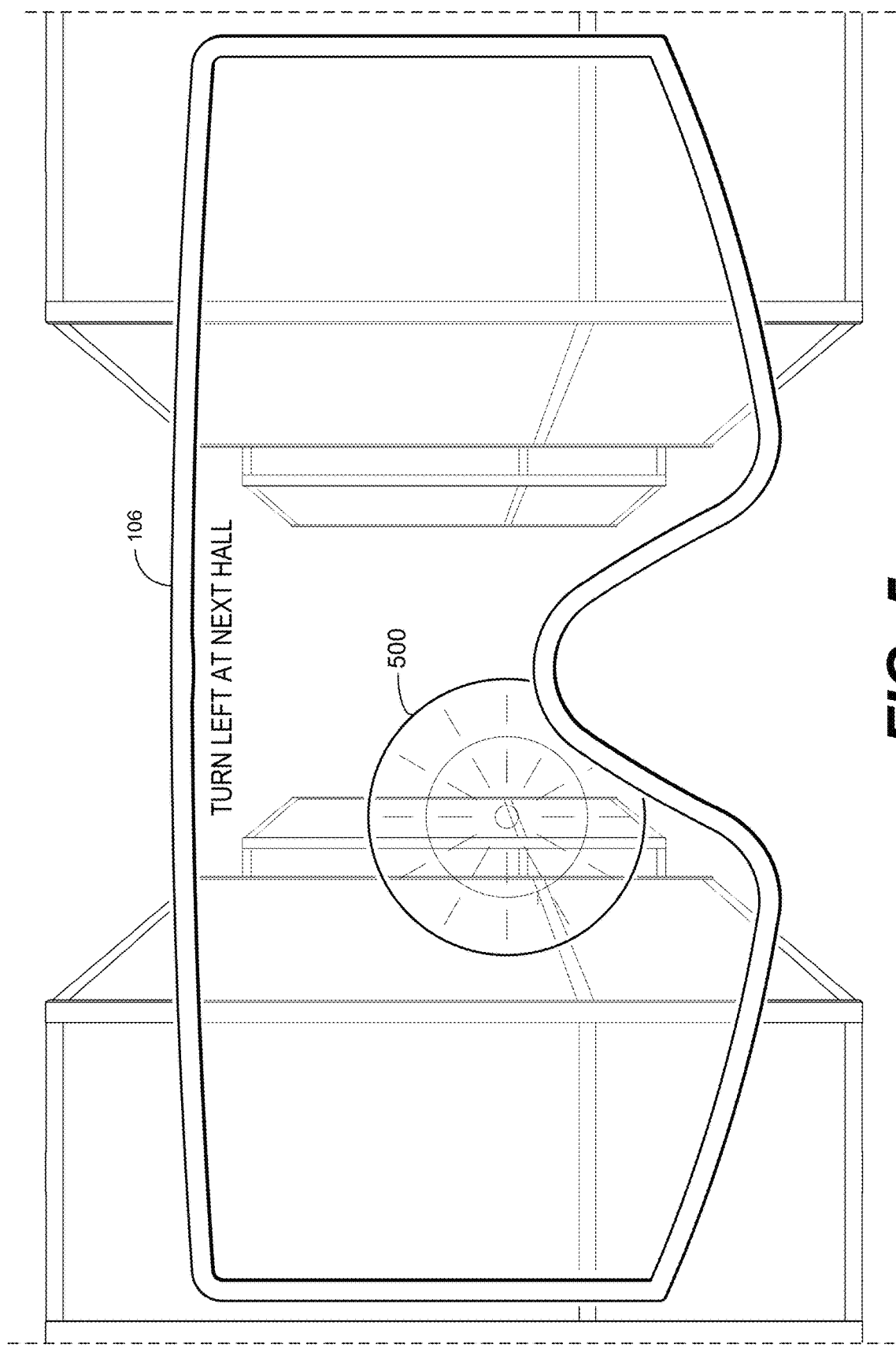
FIG. 5 is an augmented reality device providing navigation instructions according to various embodiments of the present disclosure.

Referring now to FIG. 5, a client device 106 is shown as being an augmented reality device or, more specifically, a smart glasses device. The augmented reality device may augment an environment perceived by a delivery driver and project navigation images 500 into the environment. For instance, for navigation states, the augmented reality device may project navigation images 500, such as arrows or other identifying images, to direct a delivery driver to a particular location.

Figure 6:
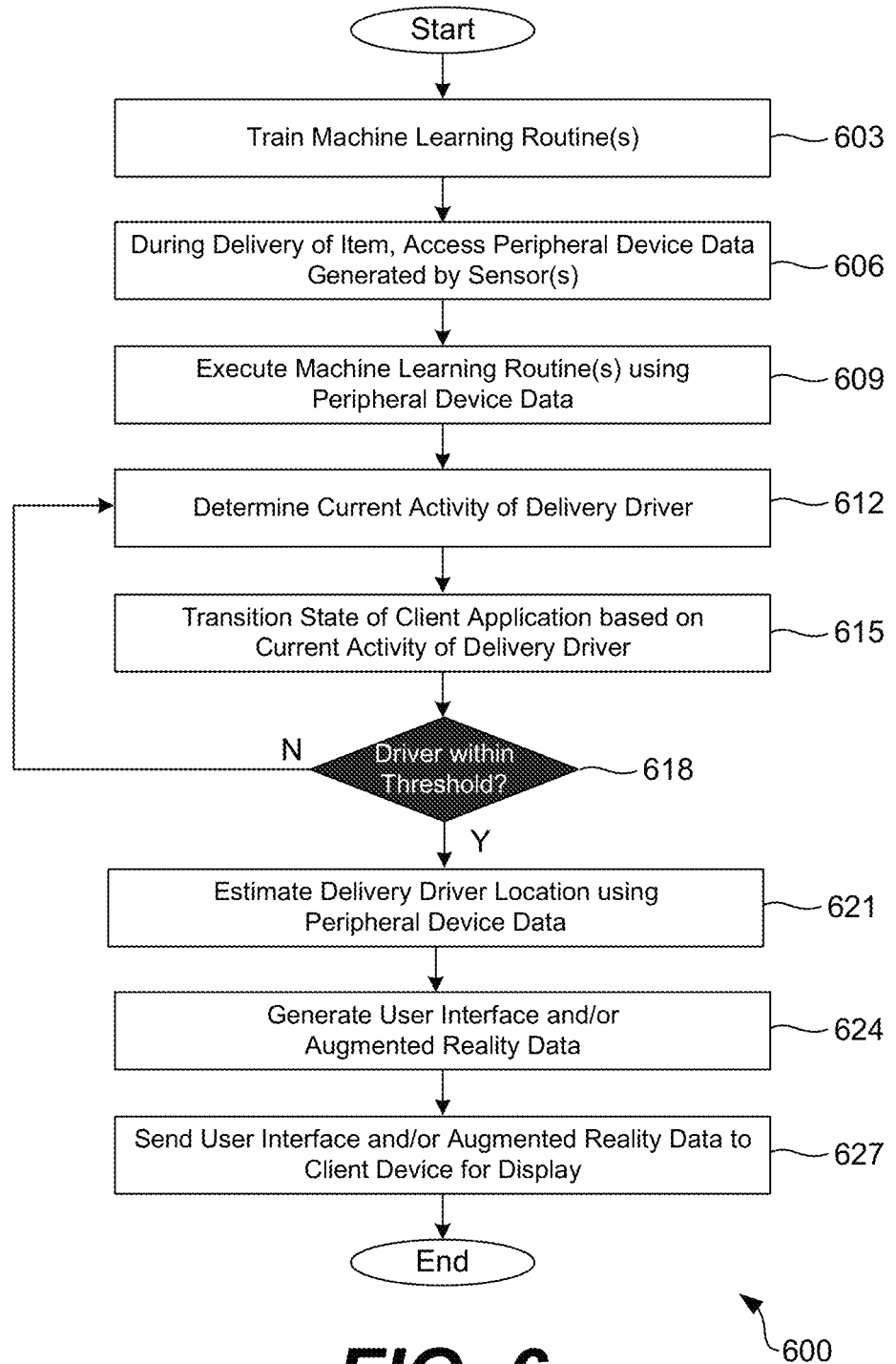
FIG. 6 is a flowchart illustrating one example of functionality implemented as portions of a peripheral device in the networked environment of FIG. 1 according to various embodiments of the present disclosure.

Referring next to FIG. 6, a flowchart 600 is shown that provides one example of the operation of a portion of the peripheral device 109 according to various embodiments. It is understood that the flowchart 600 of FIG. 6 provides merely an example of the many different types of functional arrangements that may be employed to implement the operation of the portion of the activity recognition service 177 and/or the location estimation service 180 as described herein. As an alternative, the flowchart 600 of FIG. 6 may be viewed as depicting an example of elements of a method implemented in the computing environment 103 and/or the client device 106 according to one or more embodiments.

Beginning with box 603, one or more machine learning routines 183 may be trained by the computing environment 103 and/or the peripheral device 109. In various scenarios, driver activity during a last mile journey may fall into one of three classes, namely, driving to a delivery destination, package seeking and retrieval from a vehicle cargo bay, and walking to and from a delivery destination to a vehicle. Accordingly, in some embodiments, three machine learning models may be generated that are used by the machine learning routines 183 to infer driver activity from peripheral device data 142, such as raw IMU data collected by a peripheral device 109.

Manually-verified and labelled training data may be collected from a population of delivery drivers to build and train a machine learning model for each of the three driver activities. In other words, a first machine learning model may be generated for a first class of driver activity, a second machine learning model may be generated for a second class of driver activity, and a third machine learning model may be generated for a third class of driver activity. Although three machine learning models and three driver classes are employed in this example, it is understood that other suitable numbers of machine learning routines 183 and driver classes may be employed. Using the trained machine learning models, driver activity may be inferred in real-time and generalized across populations of delivery drivers.

In box 606, the peripheral device 109 may access peripheral device data 142, for instance, during a delivery of an item. Peripheral device data 142 may include, for example, GPS sensor data 403, Wi-Fi sensor data 406, short-range wireless communication sensor data 409 (e.g., Bluetooth® or Zigbee® data), IMU sensor data, barometer data 421, and image data 424. IMU sensor data may include, for example, accelerometer sensor data 412, gyroscope sensor data 415, magnetometer sensor data 418, or other data collected from an IMU sensor or unit of a peripheral device 109.

In box 609, the peripheral device 109 may execute one or more machine learning routines 183 using the peripheral device data 142. For instance, the one or more machine learning routines 183 trained in box 603 may be executed using peripheral device data 142 as an input. In some embodiments, the one or more machine learning routines 183 include a conditional random field (CRF) machine learning routine 183.

Next, in box 612, the peripheral device 109 may determine a current activity of a delivery driver, for instance, based on the output of the machine learning routines 183. For example, the one or more machine learning routine 183 executed in box 609 may output a current activity of the delivery driver estimated based on the peripheral device data 142.

In box 615, the peripheral device 109 and/or the computing environment 103 may transition a state of a client application 165 based on the current activity of the delivery driver. For instance, when a delivery driver is in transit, the activity recognition service 177 may detect that a current activity of the delivery driver is "driving," and may interact with the location estimation service 180 to determine a real-time location of the delivery driver. As such, the item delivery service 130 may be directed to transition a state of the client application 165 to one that provides the delivery driver with navigation. The client application 165 may include an augmented reality application executed on an augmented reality device. As such, the navigation may be shown in an augmented reality environment by augmenting an environment with a navigation image 500, as may be appreciated.

In some embodiments, the peripheral device 109 and/or the computing environment 103 may detect a drop off location based on a camera feed of the client device 106 (e.g., augmented reality glasses 106b). For instance, the peripheral device 109 and/or the client device 106 may employ an object detection routine to detect objects from images captured by an imaging device. The objects may include, for example, a front door, back door, garage, mail room, which may be used to record a timestamp and a drop off location. It is understood that, in various embodiments, the peripheral device 106 and/or the client device 106 would not capture any photographs of a customer to ensure privacy. Further, in some embodiments, the peripheral device 109 and/or the client device 106 may automatically detect if an item is handed directly to a customer directly (e.g., without leaving at location outside home). This may be detected using an object detection routine executed locally on peripheral device 109 or the client device 106, as may be appreciated.

When the delivery driver arrives at a delivery location (e.g., detected through a change in driving speed), the activity recognition service 177 may interact with the location estimation service 180 to determine whether the delivery driver is within threshold distance of a delivery location or is within a delivery geo-fence. If the delivery driver is within the threshold distance, the activity recognition service 177 may determine that the current activity of the delivery driver is "parking" and a start of a service time for the delivery may be recorded in the data store 115.

Once the delivery driver parks its vehicle, the item delivery service 130 may automatically transition the client application 165 to a state that displays customer notes associated with the delivery destination in the client device 106 and/or peripheral device 109 of the delivery driver. As the driver moves to the cargo in the van and retrieves a package, the activity recognition service 177 detects a current activity of "package retrieval." By applying heuristics on a driver location (e.g., has a delivery driver location remained the same within a threshold time, such as five minutes) and delivery operational sequences, the machine learning routines 183 may infer package seeking in real-time. This may cause the item delivery service 130 to automatically transition the state of the client application 165 in which a camera of the client device 106 is used to provide a package scanning interface on the client device 106.

Once an item has been retrieved and the delivery driver starts walking towards a delivery destination (e.g., towards the door of a house or mail room of an apartment building), the activity recognition service 177 may infer a current activity of "walking." When a walking activity is inferred, the location estimation service 180 may retrieve an offline radio map and estimate a location of the delivery driver in real-time using peripheral device data 142. During the walking activity, the item delivery service 130 may provide turn-by-turn navigation to the client device 106 until a delivery driver reaches a road-entry point of a delivery address or other desired location.

The activity recognition service 177 may detect when the delivery driver reaches the delivery doorstep and stops walking, and using the location estimation service 180, may check if the delivery driver is at the delivery doorstep or other delivery location. The activity recognition service 177 may then detect a "package drop-off" activity, which may trigger an automatic transition of a state of the client application 165 to one which a camera of an augmented reality device or a client device 106 of the delivery driver automatically takes a photo to confirm completion of the delivery process.

As the delivery driver walks back to its vehicle, the activity recognition service 177 may again detect a 'walking' event and the location estimation service 180 may provide turn-by-turn navigation. Once the delivery driver reaches its vehicle, the activity recognition service 177 infers the end of the 'walking' event and records an end of the service time stamp. As the delivery driver resumes transit, the process continues, potentially without any manual intervention from the driver.

In box 618, the peripheral device 109 may determine whether a delivery driver is within a threshold distance of a delivery location. For instance, when a delivery driver arrives at a delivery location, the activity recognition service 177 may detect a change in driving speed and the location estimation service 180 may determine if the delivery driver is within a delivery geo-fence. If the delivery driver is not within a threshold distance of a delivery location (e.g., a mile or a hundred yards), the process may revert to box 612 to continue determining a current activity of the delivery driver.

Alternatively, referring again to box 618, if the delivery driver is within a threshold distance of a delivery location, the process may proceed to box 621. In box 621, the peripheral device 109 may estimate a delivery driver location using peripheral device data 142. The delivery driver location as estimated in box 621 may be used to provide an augmented reality environment having one or more navigation images 500, as may be appreciated. For instance, as a delivery driver navigates a floor, lobby, or other local delivery location, the granularity of the step-by-step navigation may be increased.

In box 624, the computing environment 103 may generate user interface data 189 and/or augmented reality data 191 for transmission to a client device 106 associated with the delivery driver. Finally, in box 627, the computing environment 103 may send the user interface data 189 and/or augmented reality data 191 to the client device 106 for display. Thereafter, the process may proceed to completion.

Figure 7:
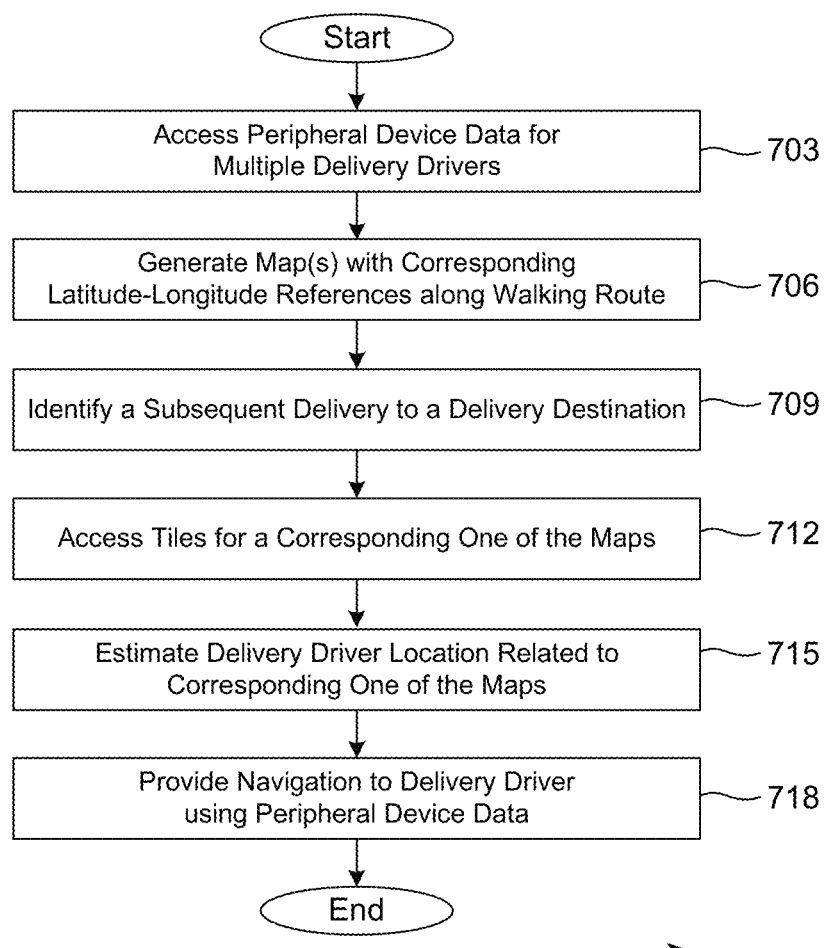
FIG. 7 is a flowchart illustrating one example of functionality implemented as portions of a peripheral device in the networked environment of FIG. 1 according to various embodiments of the present disclosure.

Referring next to FIG. 7, a flowchart 700 is shown that provides one example of the operation of a portion of the computing environment 103 according to various embodiments. It is understood that the flowchart 700 of FIG. 7 provides merely an example of the many different types of functional arrangements that may be employed to implement the operation of the portion of the item delivery service 130, the activity recognition service 177, and/or the location estimation service 180 as described herein. As an alternative, the flowchart 700 of FIG. 7 may be viewed as depicting an example of elements of a method implemented in the computing environment 103 and/or the client device 106 according to one or more embodiments.

Beginning with box 703, the peripheral device 109 may access peripheral device data 142 from multiple delivery drivers. In other words, the peripheral device 109 may access crowdsourced sensor data 132. Like peripheral device data 142, the crowdsourced sensor data 132 may include, for example, GPS sensor data 403, Wi-Fi sensor data 406, short-range wireless communication sensor data 409 (e.g., Bluetooth® or Zigbee® data), IMU sensor data, barometer sensor data 421, and image data 424. IMU sensor data my include, for example, accelerometer sensor data 412, gyroscope sensor data 415, magnetometer sensor data 418, or other data collected from an IMU sensor or unit of a peripheral device 109.

Thereafter, in box 706, the peripheral device 109 may generate a map 186 (e.g., a radio map) with corresponding latitude-longitude references along a walking route. In some embodiments, box 706 is performed on a first delivery to a delivery destination or a delivery address. As such, using peripheral device data 142 crowdsourced from a multitude of delivery drivers, the location estimation service 180 may generate a database of maps 186 (e.g., radio maps) with corresponding latitude-longitude references along routes taken by delivery drivers while walking to a delivery destination. In some embodiments, generating a map 186 of a delivery destination may be performed through a simultaneous-localization-and-mapping routine using the peripheral device data 142. The map 186 may then be stored in the map database 136 and used for online location estimation when subsequent deliveries are made to same addresses.

Accordingly, in box 709, the peripheral device 109 may identify a subsequent delivery of an item to the delivery destination.

In some embodiments, the location estimation service 180 may employ a Bayesian filter, such as Kalman filter, to provide high-accuracy, sensor-fused location estimates using often noisy peripheral device data, which is often noisy data collected from GPS sensors, Wi-Fi sensors, and other sensors 171. Currently, delivery drivers have no visibility into areas that are not geo-mapped, such as corridors, walkways, and other indoor environments.

In box 712, the peripheral device 109 may access tiles of a map 186, or other assets associated therewith, from the map database 136 corresponding to a delivery location. The tiles may include tiles corresponding to a region within a predefined distance (e.g., one mile) of the delivery location, as may be appreciated. In box 715, the peripheral device 109 may estimate a location of a delivery driver relative to the map 186 accessed in box 712. Finally, in box 718, turn-by-turn navigation may be provided to the delivery driver using peripheral device data 142 continuously generated and accessed on the peripheral device 109. Thereafter, the process may proceed to completion.

Figure 8:
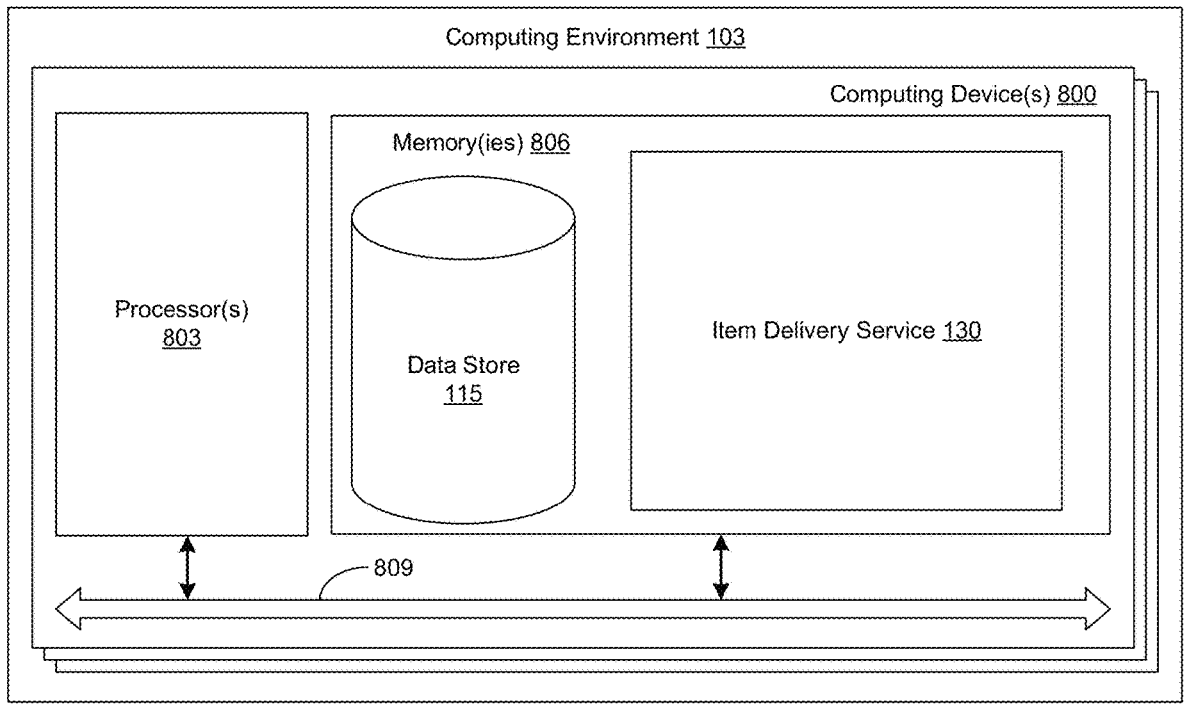
FIG. 8 is a schematic block diagram that provides one example illustration of a computing environment employed in the networked environment of FIG. 1 according to various embodiments of the present disclosure.

With reference to FIG. 8, shown is a schematic block diagram of the computing environment 103 according to an embodiment of the present disclosure. The computing environment 103 includes one or more computing devices 800. Each computing device 800 includes at least one processor circuit, for example, having a processor 803 and a memory 806, both of which are coupled to a local interface 809. To this end, each computing device 800 may include, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 is the item delivery service 130 and potentially other applications. Also stored in the memory 806 may be a data store 115 and other data. In addition, an operating system may be stored in the memory 806 and executable by the processor 803.

Figure 9:
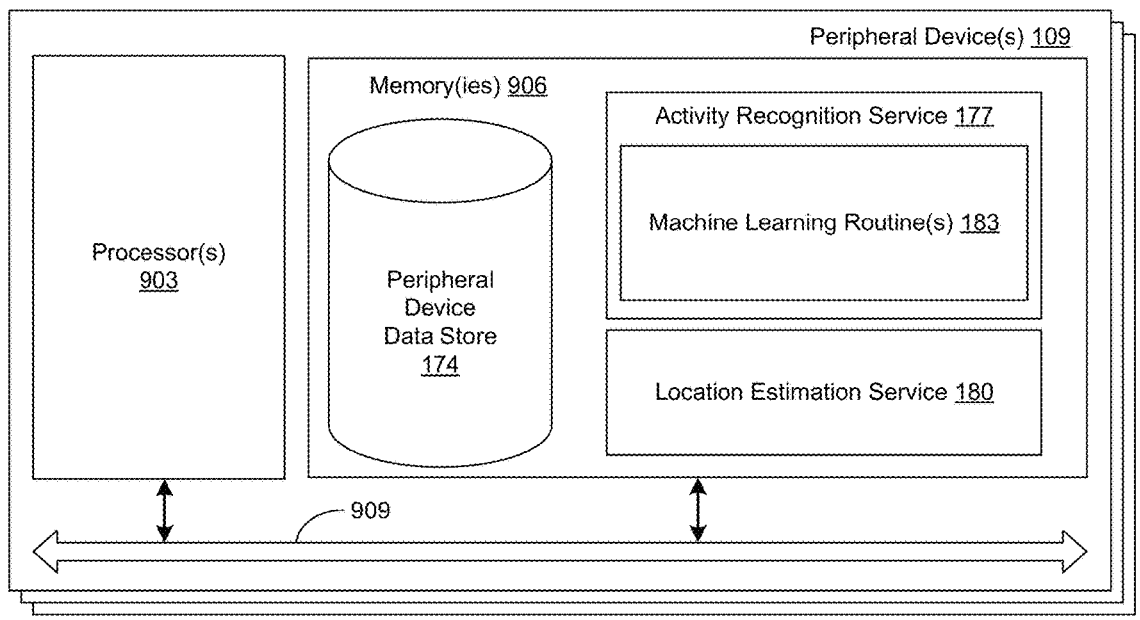
FIG. 9 is a schematic block diagram that provides one example illustration of a peripheral device employed in the networked environment of FIG. 1 according to various embodiments of the present disclosure.

Finally, with reference to FIG. 9, a schematic block diagram of the peripheral device 109 is shown according to an embodiment of the present disclosure. The peripheral device 109 may include one or more computing devices. Each computing device includes at least one processor circuit, for example, having a processor 903 and a memory 906, both of which are coupled to a local interface 909. The local interface 909 may include, for example, a data bus with an accompanying address/control bus or other bus structure as can be appreciated.

Stored in the memory 906 are both data and several components that are executable by the processor 903. In particular, stored in the memory 906 and executable by the processor 903 is the active recognition service 177, the location estimation service 180, the machine learning routines 183, and potentially other applications. Also stored in the memory 906 may be a peripheral device data store 174 and other data. In addition, an operating system may be stored in the memory 906 and executable by the processor 903.

It is understood that there may be other applications that are stored in the memory 806, 906 and are executable by the processor 803, 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806, 906 and are executable by the processor 803, 903. In this respect, the term "executable" means a program file that is in a form that can ultimately be run by the processor 803, 903. Examples of executable programs may be, for example, a compiled program that can be translated into machine code in a format that can be loaded into a random access portion of the memory 806, 906 and run by the processor 803, 903, source code that may be expressed in proper format such as object code that is capable of being loaded into a random access portion of the memory 806, 906 and executed by the processor 803, 903, or source code that may be interpreted by another executable program to generate instructions in a random access portion of the memory 806, 906 to be executed by the processor 803, 903, etc. An executable program may be stored in any portion or component of the memory 806, 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806, 906 is defined herein as including both volatile and nonvolatile memory and data storage components. Volatile components are those that do not retain data values upon loss of power. Nonvolatile components are those that retain data upon a loss of power. Thus, the memory 806, 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803, 903 may represent multiple processors 803, 903 and/or multiple processor cores and the memory 806, 906 may represent multiple memories 806, 906 that operate in parallel processing circuits, respectively. In such a case, the local interface 809, 909 may be an appropriate network that facilitates communication between any two of the multiple processors 803, 903, between any processor 803, 903 and any of the memories 806, 906, or between any two of the memories 806, 906, etc. The local interface 809, 909 may comprise additional systems designed to coordinate this communication, including, for example, performing load balancing. The processor 803, 903 may be of electrical or of some other available construction.

Although the item delivery service 130, the activity recognition service 177, the machine learning routines 183, the location estimation service 180, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the peripheral device 109 and/or the computing environment 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803, 903 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item delivery service 130, the activity recognition service 177, the machine learning routines 183, and the location estimation service 180, that comprises software or code can be embodied in any non-transitory computer-readable medium for use by or in connection with an instruction execution system such as, for example, a processor 803, 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the item delivery service 130, the activity recognition service 177, the machine learning routines 183, and the location estimation service 180, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having program instructions stored thereon executable by at least one hardware processor that, when executed, direct the at least one hardware processor to:
receive peripheral device data from at least one peripheral device associated with a delivery driver, the peripheral device comprising at least one sensor configured to generate the peripheral device data;
determine, through execution of a machine learning routine, a current activity and a current location of the delivery driver relative to a delivery destination;
in response to the delivery driver being within a threshold distance of the delivery destination, determine a current state of a delivery process through execution of a machine learning routine using the peripheral device data as an input to the machine learning routine;
transition a client application executing on an augmented reality device associated with the delivery driver between a plurality of states based at least in part on the current state of the delivery process, wherein the transition of the client application between states is performed without a manual interaction with the augmented reality device;

wherein at least one of the states of the client application comprises providing navigation directions in an augmented reality environment provided by the augmented reality device; and, wherein:
in an instance in which the current activity indicates that the delivery driver is driving to a delivery destination, the machine learning routine utilizes a first machine learning model;
in an instance in which the current activity indicates that the delivery driver is seeking or retrieving the item from a cargo area of a vehicle, the machine learning routine utilizes a second machine learning model; and
in an instance in which the current activity indicates that the delivery driver is walking to or from a delivery destination to the vehicle, the machine learning routine utilizes a third machine learning model.

2. The non-transitory computer-readable medium of claim 1, wherein the at least one peripheral device is a plurality of peripheral devices, the plurality of peripheral devices comprising a smartphone computing device, a wearable electronic device, and a smart glasses device.

3. The non-transitory computer-readable medium of claim 1, wherein the current location of the delivery driver relative to the delivery destination is determined after filtering the peripheral device data using a Bayesian filter.

4. A computer-implemented method, comprising:
in association with a delivery of an item by a delivery driver, accessing peripheral device data generated by at least one sensor of at least one peripheral device;
determining, through execution of a machine learning routine, a current activity of the delivery driver, wherein the peripheral device data is provided as an input to the machine learning routine;
automatically transitioning a client application executing on a client device associated with the delivery driver between a plurality of states based on the current activity of the delivery driver; and
wherein:
in an instance in which the current activity indicates that the delivery driver is driving to a delivery destination, the machine learning routine utilizes a first machine learning model;
in an instance in which the current activity indicates that the delivery driver is seeking or retrieving the item from a cargo area of a vehicle, the machine learning routine utilizes a second machine learning model; and
in an instance in which the current activity indicates that the delivery driver is walking to or from a delivery destination to the vehicle, the machine learning routine utilizes a third machine learning model.

5. The computer-implemented method of claim 4, wherein the peripheral device data comprises at least one of: global positioning system (GPS) data; wireless fidelity (Wi-Fi) data; short-range wireless communication sensor data; accelerometer data; gyroscope data; magnetometer data; barometer data; and image data.

6. The computer-implemented method of claim 4, wherein the current activity of the delivery driver is one of a driving state, a parked state, a package retrieval state, a walking state, and a package drop off state.

7. The computer-implemented method of claim 4, wherein:
the current activity of the delivery driver is a parked state; and
the computer-implemented method further comprises:
determining whether the peripheral device is within a threshold distance of a delivery destination; and
in response to the peripheral device being within the threshold distance, automatically transitioning the client application to one of the states that displays at least one of a delivery note and a map associated with the delivery of the item to a delivery destination on the client device.

8. The computer-implemented method of claim 4, further comprising:
generating a map of a delivery destination through a simultaneous-localization-and-mapping (SLAM) routine using the peripheral device data.

9. The computer-implemented method of claim 8, further comprising providing navigation to the delivery destination on the client device using the map and the peripheral device data during a subsequent delivery to the delivery destination.

10. The computer-implemented method of claim 4, wherein:
the current activity of the delivery driver is a walking state; and
the computer-implemented method further comprises automatically transitioning the client application to one of the states that provides a turn-by-turn navigation to a delivery destination.

11. The computer-implemented method of claim 4, wherein:
the current activity of the delivery driver is a package drop off state; and
the computer-implemented method further comprises:
automatically transitioning the client application to one of the states that facilitates a capture of the item using a camera of the client device; and
implementing an object detection routine to detect a drop off of the item.

12. The computer-implemented method of claim 11, further comprising storing a delivery location of the item in memory in response to the drop off of the item being detected.

13. The computer-implemented method of claim 4, wherein the machine learning routine is a conditional random field (CRF) machine learning routine.

14. The computer-implemented method of claim 4, wherein the client device is an augmented reality device and the client application is configured to provide an augmented reality environment.

15. The computer-implemented method of claim 4, wherein the machine learning routine executed to determine the current activity of the delivery driver is executed locally on the client device.

16. The computer-implemented method of claim 4, wherein the machine learning routine executed to determine the current activity of the delivery driver is executed remotely on at least one server computing device.

17. A system, comprising:
a client device comprising at least one hardware processor; and
a peripheral device comprising at least one sensor and at least one processing circuit configured to:
in association with a delivery of an item by a delivery driver, access peripheral device data generated by the at least one sensor;

determine, through execution of a machine learning routine, a current activity and a current location of the delivery driver using the peripheral device data;

automatically transition a client application executing on the client device associated with the delivery driver between a plurality of states based on the current activity and the current location of the delivery driver; and wherein:
- in an instance in which the current activity indicates that the delivery driver is driving to a delivery destination, the machine learning routine utilizes a first machine learning model;
- in an instance in which the current activity indicates that the delivery driver is seeking or retrieving the item from a cargo area of a vehicle, the machine learning routine utilizes a second machine learning model; and
- in an instance in which the current activity indicates that the delivery driver is walking to or from a delivery destination to the vehicle, the machine learning routine utilizes a third machine learning model.

18. The system of claim 17, wherein:
the at least one sensor is at least one of: a global positioning system (GPS) sensor; a wireless fidelity (Wi-Fi) sensor; a short-range wireless communication sensor; an accelerometer sensor; a gyroscope sensor; a magnetometer sensor; a barometer sensor; and a camera.

19. The system of claim 17, wherein the current activity of the delivery driver is one of a driving state, a parked state, a package retrieval state, a walking state, and a package drop off state.

20. The system of claim 18, wherein the peripheral device data comprises at least one of: global positioning system data; wireless fidelity data; short-range wireless communication sensor data; accelerometer data; gyroscope data; magnetometer data; barometer data; and image data.

* * * * *